United States Patent [19]

Wimbish et al.

[11] Patent Number: 5,409,582
[45] Date of Patent: Apr. 25, 1995

[54] SILVER BATH WASTE TREATMENT APPARATUS AND METHOD

[75] Inventors: Wayne D. Wimbish, St. Charles; Richard C. Hallcher, Maryland Heights, both of Mo.

[73] Assignee: Monsanto Company, St. Louis, Mo.

[21] Appl. No.: 10,729

[22] Filed: Jan. 29, 1993

[51] Int. Cl.⁶ .......................... C25C 1/12; C25C 1/20; C25B 15/00
[52] U.S. Cl. ........................ 204/106; 204/109; 204/149; 204/237; 204/267
[58] Field of Search ............... 204/109, 106, 269, 237, 204/149, 267

[56] References Cited

U.S. PATENT DOCUMENTS

| 4,090,935 | 5/1978 | Dunning, Jr. et al. | 204/146 |
| 4,564,432 | 1/1986 | Nagai et al. | 204/237 |

OTHER PUBLICATIONS

Edmund C. Potter, *Electrochemistry, Principles & Applications*, Cleaver-Hume Press Ltd., London (1956) pp. 110–112 and 307.

*Primary Examiner*—John Niebling
*Assistant Examiner*—Brendan Mee
*Attorney, Agent, or Firm*—Thomas E. Kelley

[57] ABSTRACT

Apparatus and methods for removing silver and copper ions from purge streams from silver replacement processes by separately electrowinning silver and copper where silver removal is first effected in an electrowinning cell having a cathode/calomel reference electrode potential between −0.1 and −0.4 volts DC followed by copper removal effected in an electrowinning cell having a cathode/calomel reference electrode potential less than −0.5 volts DC. By this method formation of copper (+1) is prevented in the presence of high concentrations of silver, thus minimizing precipitation of silver metal and formation of copper (+2).

17 Claims, 1 Drawing Sheet

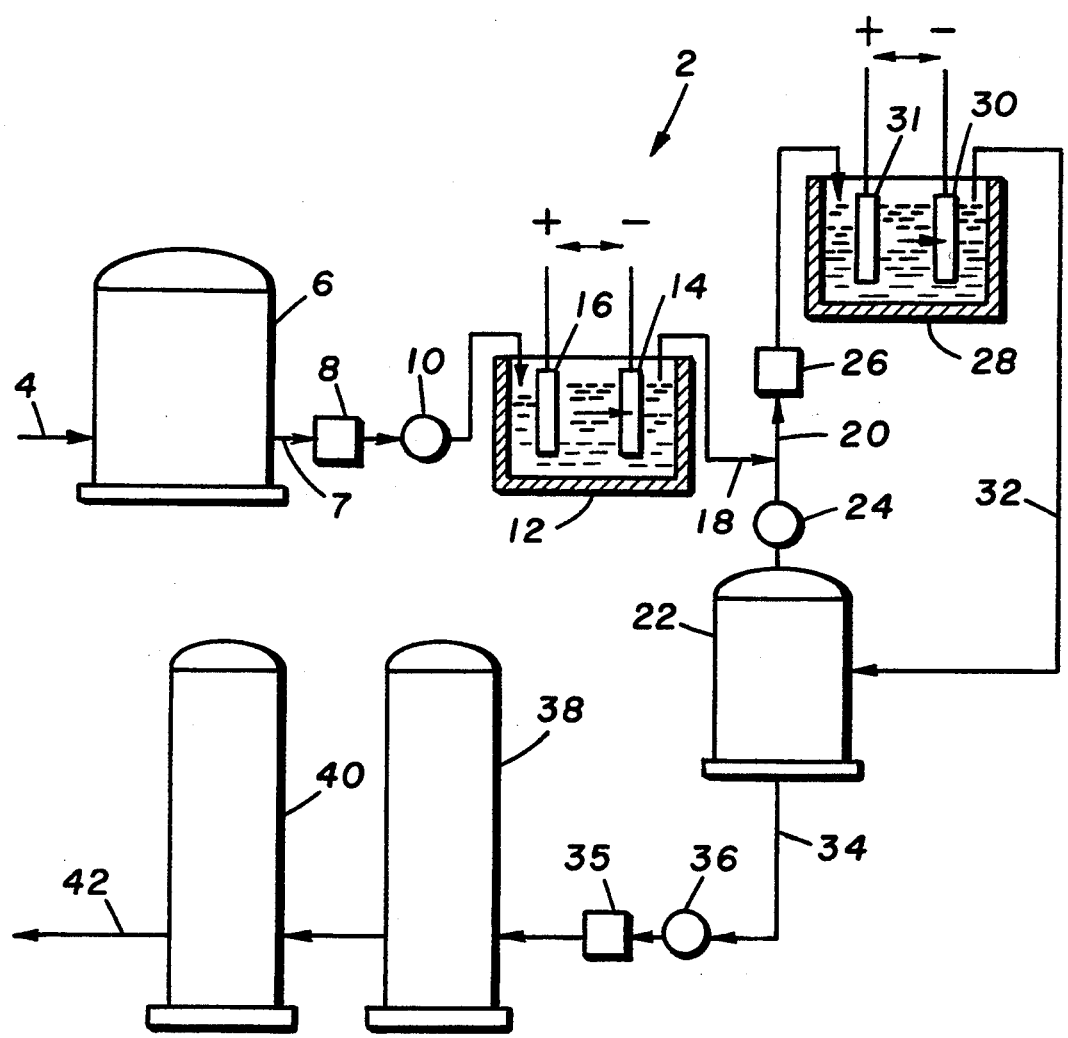

SILVER BATH WASTE TREATMENT APPARATUS AND METHOD

BACKGROUND OF THE INVENTION

The present invention relates to a method and apparatus for removing silver and copper ions from solutions, e.g. a silver replacement process purge stream. In another aspect the invention relates to a method of separating silver and copper by selectively electrowinning silver at a higher cathode/reference reduction potential than that of the copper. In yet another aspect, the method provides for electrowinning copper ions from a silver-depleted stream that is substantially diluted.

In the electrolytic refining of silver as well as in silver coating processes wherein silver is deposited on a copper electrode or electrolessly deposited from cyanide solutions or ammoniacal silver solutions, the rate of silver deposition is retarded in proportion to the concentration of copper in the solution. Traditionally, low copper concentrations in silver replacement solutions or in silver refining process solutions has been an important goal due to the interference of the copper ions with the silver covering or plating quality.

More recently, contrary to the prior art admonitions against high levels of copper in a replacement solution, it has been found that resulting deposited or plated silver can present a surprisingly brighter appearance with substantially lower surface resistivity and improved oxidation resistance if the replacement solutions include measured amounts of copper. In either case, whether the copper is an unwanted contaminant or a controlled amount of copper is desired, silver replacement process purge streams or purge streams from silverplating refining processes contain substantial amounts of copper ion along with silver ions. Such concentrations present substantial problems in removal of the copper and silver ions, for example, copper ion forms in the presence of high concentrations of silver ions which leads to the precipitation of silver metal and the formation of copper. Precipitation of silver causes sludge formation, poor electrode life time and high silver discharge from ion exchange procedures.

Control of copper ion concentrations within silver refining procedures or silverplating procedures requires improved methodologies for separating both silver and the copper ions from each other and from process solutions. For example, in working with a silverplating bath waste solution containing both copper and silver ions, effluent from such processing requires significant reduction of such ion contents before discharge limits can be reached.

SUMMARY OF THE INVENTION

The present invention provides for removal of silver and copper ions from solutions such as silver replacement process purge streams. It has been found that reduction of silver and copper ions in these purge streams to a level that permits stream disposal can be met by separately electrowinning the silver and copper by selectively removing the silver first at a cathode/calomel reference electrode potential higher than the potential for copper. Such a procedure prevents formation of copper (+1) in the presence of high concentrations of silver (+1) which leads to the precipitation of silver metal and the formation of copper (+2). Precipitation of silver (0) causes sludge formation, poor electrode life time and high silver discharge from ion exchange units.

Earlier batch mode treatment of silver replacement process purge streams experienced serious problems such as silver precipitation and on occasions copper electrodes were totally dissolved. Other attempts to avoid these problems utilize steady state concentrations of metal ions kept at low levels by using diluted purge. While this approach was somewhat more successful, electrode life time was still reduced to low levels and ion exchange problems remained because of silver :solid formation.

Further investigation indicated that silver removal at a fixed potential from a diluted purge stream yielded improved electroplating of bath silver and copper, however silver concentration was still too high in the copper-removing cell. In order to improve current efficiency in the silver cell, the purge stream was reduced directly without dilution or without substantial dilution with significant improvement in process recovery.

The method for recovering metal from a silver replacement bath solution containing ionic silver and ionic copper and one or more metal complexing agents, e.g. ammonia, results from passing the solution through a first electrowinning cell operated at a cathode potential not less than $-0.4$ volts DC with respect to a calomel reference electrode to selectively recover at the cathode a predominantly silver metal from the solution, thereby producing a silver-depleted solution. Cathode to calomel reference electrode potentials are typically measured by placing the calomel reference electrode close to the cathode. Optionally, an aqueous diluent can be added to the silver-depleted solution to provide a diluted silver-depleted solution having a silver concentration sufficiently low to prevent spontaneous reduction of silver by copper (1) species generated during electrowinning of copper from the solution. The diluted or undiluted silver-depleted solution is then presented to a second electrowinning cell operated at a cathode potential less than $-0.5$ volts DC with respect to a calomel reference electrode to recover predominantly copper metal at the cathode thereby producing a copper and silver-depleted solution effluent.

BRIEF DESCRIPTION OF THE DRAWING

The method according to the invention is explained in the following detailed description by reference to the accompanying drawing representing a flowchart of an apparatus according to the invention for carrying out the method.

DETAILED DESCRIPTION OF THE INVENTION

When reference to the drawing a silver bath waste treatment apparatus 2 is presented with specific sizing and capacity. It is to be understood that such sizing and capacity is for example purposes only and that such apparatus and methodology can be expanded or manipulated to accommodate greater or lesser capacity for the silverplating bath purge stream 4. The silver replacement bath purge stream 4 is pumped from a plating tank to the silver purge holding tank 6 at, for example, a nominal flow rate of 15.7 milliliters/second (ml/s) (0.25 gpm). The purge is drawn from the purge holding tank 6 through a filter 8 by a pump 10 and is delivered to the silver electrowinning cell 12 containing at least one anode and at least one cathode. Typically flow rate is maintained so that the level in the purge holding tank remains constant. A typical concentration of the incoming purge to the silver purge holding tank 6 is approximately 1200 parts per million silver and approximately 1800 parts per million copper.

Silver is electroplated onto cathodes, e.g. graphite, silver, nickel or other metal not chemically replaced by silver, by applying a cell voltage between the anode and cathode that corresponds to a cathode potential with respect to a calomel reference electrode in the range of $-0.1$ to $-0.4$ volts DC, preferably in the range of $-0.15$ to $-0.3$ volts DC. For optimal deposition a preferred cathode potential in the range of $-0.2$ to $-0.3$ volts DC, more preferably at about $-0.25$ volts DC. In other cases where higher purity deposits are desired, a preferred cathode potential is in the range of $-0.15$ to $-0.25$ volts DC.

The corresponding cell potential between adjacent anodes and cathode will vary depending on cell design and location with the cell. When the cell used in the following illustrative description of this invention was operated at a cathode to anode cell potential of about 1.2 volts DC, the corresponding cathode/calomel reference electrode potential was about $-0.25$ volts DC.

The purge stream, now typically reduced approximately 90–98% in silver concentration, exits the silver electrowinning cell 12 by overflow as silver-depleted solution stream 18 containing approximately 20–100 parts per million silver and approximately the original 1800 parts per million copper. The silver-depleted stream can be passed to the copper electrowinning cell. More preferably, the silver-depleted stream is mixed with the copper electrowinning cell recirculation stream 20. Although not critical, a ratio of the volume of silver-depleted stream to volume of recirculation stream of less than 0.1, e g about 0.025 has been found to be effective. After mixing, the concentration of the combined streams is approximately 1 to 5 parts per million silver and from about 50 to 70 parts per million copper.

The combined streams flow through a filter 26, the flow being moved by pump 24. After the stream passes through filter 26, the combined stream flows directly into the copper electrowinning cell 28 where the copper is electroplated onto cathodes 30 at a relatively lower cathode/calomel reference electrode potential than in the silver electrowinning cell 12. The copper is electroplated onto a cathode, e.g. copper, nickel, graphite, etc., at less than $-0.5$ volts DC cathode potential with respect to a Calomel reference electrode, preferably in the range of $-0.6$ to $-2.0$ volts DC, more preferably $-1.2$ to $-1.6$ volts DC. When the cell described in the following illustrative disclosure was operated at a cathode to anode cell potential of 2.1 volts DC, the cathode/calomel reference electrode potential was about $-1.4$ volts DC. After passage through the copper electrowinning cell 28, the silver/copper-depleted solution stream 32 is typically reduced in silver and copper content to less than 2 parts per million silver and less than 35 parts per million copper. The silver/copper-depleted solution stream 32, now low in concentration of both silver and copper ions exits the copper electrowinning cell 28 through an overflow and flows back into the ion exchange feed tank 22. Circulation and mixing can be provided in the ion exchange feed tank 22 by means of a submersible pump.

Part of the low concentration silver/copper-depleted solution in the ion exchange feed tank 22 feeds back into the recirculation loop to again mix with silver reduced purge and begins the copper cycle again. Maintaining a constant level in the ion exchange feed tank 22, effluent 34 is moved by pump 36 through an additional filter to ion exchange columns 38 and 40.

Ion exchange of the ion exchange feed tank effluent 34 consists of two steps, copper removal followed by silver removal. The copper removal ion exchange columns 38 present one or more columns packed with the appropriate resin for copper removal, e.g. a macroreticular resin having iminodiacetic acid functional groups will preferentially remove copper from a solution of copper and silver. The first column in each step, either copper or silver removal, is for primary metal removal and the rest are for efficiency and backup protection when the first column has reached capacity and broken through. The silver removal ion exchange columns 40 are filled with an appropriate resin for silver removal, e.g. a macroreticular resin having mercaptan functional groups, preferably benzyl mercaptan groups. The copper and silver effluent from the copper removal ion exchange columns 38 and the silver removal ion exchange columns 40 presents a silver/copper-depleted solution suitable for discharge 42.

By way of example, a 15.7 ml/s purge stream containing 1.2 g/l Ag and 1.8 g/l Cu was passed to a first electrowinning cell containing 10 nickel cathodes having 0.16 $m^2$ (252 $in^2$) cross sectional area per cathode from Eltech Industries operated at 1.2 volt cathode/anode cell potential (35 amps) providing $-0.25$ volt cathode/calomel reference electrode potential. This operation reduced the silver concentration to 20 ppm with the copper concentration essentially unaffected. The silver-reduced stream was then mixed into a 38 l/m (10 gpm) stream recirculating through a second electrowinning cell containing 30 nickel cathodes operated at 2.1 volts cathode/anode cell potential (180 amps) providing $-1.5$ volt cathode potential, reducing the copper concentration to less than 35 ppm and the silver to less than 2 ppm.

Anodes utilized in the present invention can be of a special coating of iridium oxide on a titanium substrate and are designed to promote the evolution of oxygen from the oxidation of water rather than oxiding metals and solution. However, any of a variety of anode coatings and substrates known in the art can also be utilized.

The method according to the invention for recovering metal from a silver-plating bath purge solution containing ionic silver and ionic copper and one or more metal complexing agents can be achieved by reducing the purge directly without substantial dilution or any dilution. In other embodiments aqueous solution can be added to the silver-depleted solution to provide a diluted silver-depleted solution having a silver concentration sufficiently low to prevent spontaneous reduction of silver by copper species generated during electrowinning of copper from the solution. In another embodiment, recycling of a portion of silver/copper-depleted solution from the second or copper electrowinning cell can be recycled in order to achieve a silver diluted solution having the lower silver concentration sufficient to prevent spontaneous reduction of silver by copper.

The methodology also utilizes ion exchange columns to further reduce the silver and copper ion content of the silver/copper-depleted solution flowing from the copper electrowinning cell and ion exchange feed tank effluent. The effluent passes first through a copper selective ion exchange resin to remove predominantly copper from said silver/copper-depleted solution, for example a macroreticular ion exchange resin containing iminodiacetic acid functional groups. The effluent then passes through a silver selective ion exchange resin to reduce the concentration of silver to less than 10 parts per billion, for example a macroreticular ion exchange resin containing mercaptan functional groups, e.g. benzyl mercaptan functional groups.

Numerous modifications and variations in the practice of the invention are expected to occur to those skilled in the art. The embodiments described in the alternative embodiments presented are intended as examples rather than as limitations. Thus, the description of the invention is not intended to limit the invention to the particular embodiments disclosed, but it is intended to encompass all of the equivalents and subject matter within the spirit and scope of the invention as described above and as set forth in the following claims.

What is claimed is:

1. A method for recovering metal from an aqueous solution containing ionic silver and ionic copper, said method comprising: (a) passing said solution through a first electrowinning cell comprising at least one anode and at least one cathode, wherein said cell is operated at a cathode to calomel reference electrode potential in the range of $-0.1$ to $-0.4$ volts DC to selectively recover at the cathode a predominately silver metal from said solution, thereby producing a silver-depleted solution;

(b) diluting said silver-depleted solution with an aqueous diluent to provide a diluted silver-depleted solution;

(c) passing said diluted silver-depleted solution through a second electrowinning cell comprising at least one anode and at least one cathode, wherein said cell is operated at a cathode to said calomel reference electrode potential less than $-0.5$ volts DC to recover predominately copper at the cathode thereof, thereby producing a silver and copper-depleted solution which is used as said aqueous diluent.

2. A method according to claim 1 wherein said diluted silver and copper-depleted solution has a silver concentration less than about 20 parts per million.

3. A method according to claim 1 wherein said silver and copper-depleted solution is passed in contact with a copper-selective ion-exchange resin to provide an effluent with less than 1 parts per million copper.

4. A method according to claim 3 wherein said copper-selective ion-exchange resin is an iminodiacetic acid-functionalized resin.

5. A method according to claim 3 wherein said effluent is passed in contact with a silver-selective ion exchange resin to reduce the silver concentration to less than 10 parts per billion.

6. A method according to claim 5 wherein silver-selective ion exchange resin is a mercaptan-functionalized resin.

7. A method according to claim 1 wherein said first electrowinning cell is operated at a cathode to said calomel reference electrode potential in the range of $-0.15$ to $-0.25$ volts DC.

8. A method according to claim 7 wherein said second electrowinning cell is operated at a cathode to said calomel reference electrode potential in the range of $-0.6$ to $-2$ volts DC.

9. A method according to claim 8 wherein said second electrowinning cell is operated at a cathode to said calomel reference electrode potential in the range of $-1.2$ to $-1.6$ volts DC.

10. A method according to claim 1 wherein said first electrowinning cell is operated at a cathode to said calomel reference electrode potential in the range of $-0.2$ to $-0.3$ volts DC.

11. A method according to claim 10 wherein said second electrowinning cell is operated at a cathode to said calomel reference electrode potential in the range of $-0.6$ to $-2$ volts DC.

12. A method according to claim 11 wherein said second electrowinning cell is operated at a cathode to said calomel reference electrode potential in the range of $-1.2$ to $-1.6$ volts DC.

13. A method according to claim 1 wherein said silver-depleted solution is mixed into a silver and copper-depleted solution recirculating through said second electrowinning cell, wherein the ratio of the volume of said silver-depleted solution to the volume of the recirculating solution is less than 0.1.

14. A method according to claim 13 wherein said first electrowinning cell is operated at a cathode to said calomel reference electrode potential in the range of $-0.15$ to $-0.3$ volts DC.

15. A method according to claim 14 wherein said second electrowinning cell is operated at a cathode to said calomel reference electrode potential in the range of $-0.6$ to $-2$ volts DC.

16. A method according to claim 15 wherein said second electrowinning cell is operated at a cathode to said calomel reference electrode potential in the range of $-1.2$ to $-1.6$ volts DC.

17. Apparatus comprising at least two electrowinning cells adapted for selectively electrowinning silver and copper from a solution containing silver and copper ions flowing through said cells, said apparatus comprising:

(a) at least one first electrowinning cell having an anode and a cathode wherein said first cell is adapted to selectively extract silver from a solution of silver ions and copper ions at a cathode having a potential with respect to a calomel reference electrode between $-0.1$ and $-0.4$ volts DC thereby providing a silver-depleted solution, (b) at least one second electrowinning cell having an anode and a cathode wherein said second cell is adapted to selectively extract copper from a solution of silver ions and copper ions recirculating through said second cell at a cathode having a potential with respect to a calomel reference electrode less than $-0.5$ volts DC, (c) means for recirculating the solution through said second cell, and (d) means for adding the silver-depleted solution to the recirculating solution.

* * * * *